Patented Feb. 15, 1944

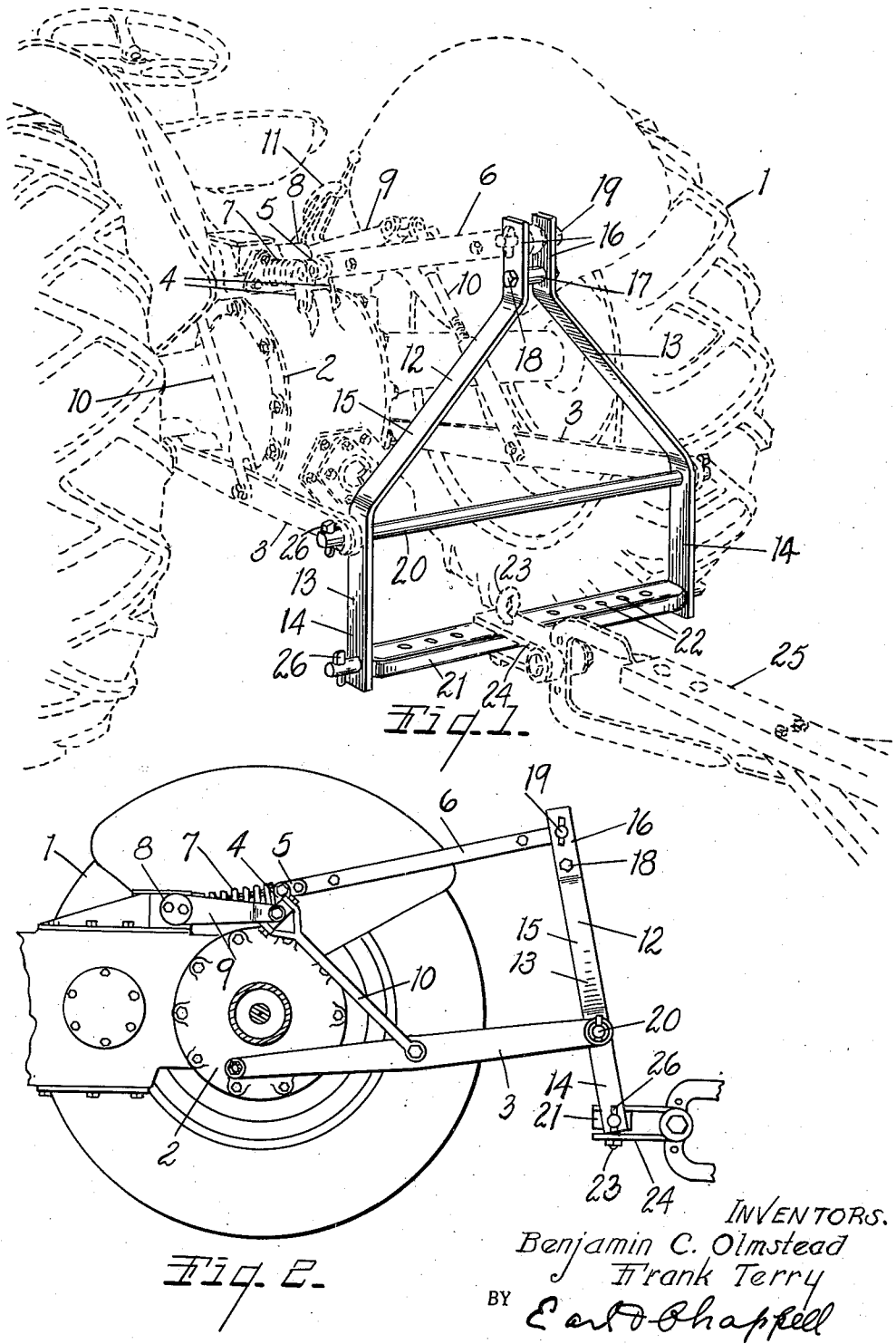

2,341,807

UNITED STATES PATENT OFFICE 2,341,807

TRACTOR DRAWBAR STRUCTURE OR DEVICE

Benjamin C. Olmstead and Frank J. Terry, Allegan, Mich.

Application February 2, 1942, Serial No. 429,238

10 Claims. (Cl. 280—33.44)

This invention relates to improvements in tractor draw bar structures or devices.

The main objects of this invention are:

First, to provide a draw bar structure or device for farm tractors which adapts the tractor for use with various types of farm implements, securing the advantages of increased traction under conditions where that is desirable.

Second, to provide a tractor hitch structure having these advantages which is very simple and inexpensive in construction, readily applicable to extensively used types of farm tractors for attaining the results stated.

Objects relating to details and economies of the invention will appear from the description to follow. The invention is defined in the claims.

A preferred embodiment of the invention is illustrated in the accompanying drawing, in which:

Fig. 1 is a view in perspective illustrating in solid lines the attachment or adapter of our invention operatively associated with a well known type of farm tractor (shown in dotted line outline), and with the draft tongue of a farm implement to be drawn thereby (also shown in outline).

Fig. 2 is a fragmentary view in side elevation further illustrating structural details and the method of connection of the adapter to the tractor draft linkage.

This invention relates to a tractor hitch or adapter attachment which is particularly devised for use in association with a farm tractor of the type shown and described in Ferguson Patents 2,118,180 and 2,118,181 of May 24, 1938. This is a well known type of tractor having a draw bar and thrust link which are adapted to be operatively connected to a specially designed plow in such manner that as the plow passes through the earth the force represented by its resistance to forward motion exerted on the draw bar is rendered effective in opposite direction on the thrust link with the result that the plow is positively maintained in effective engagement with the earth and downward and forward thrust exerted on the tractor to increase its traction. Should this thrust force exceed a predetermined maximum, for example in case a buried rock is struck by the plow, the maximum being governed by the strength of a spring associated with the thrust link, the latter then operates to actuate a hydraulic control instrumentality which thereupon raises the draw bar and elevates the plow to clear the obstruction. This hydraulic instrumentality may likewise be manually actuated by the operator when desired to adjust the height of the implement drawn.

Our invention comprises a hitch device or attachment for tractors having plow-draft means of the foregoing type, rendering the same capable of use for propelling or drawing substantially any type of farm implement or vehicle or drawn or propelled load, and securing the desired result of increasing the traction of the tractor regardless of the type of implement or vehicle hitched to the tractor, such for example as diskers, cultivators, harrows, rollers, vehicles, and the like.

Referring to the embodiment of the invention illustrated in the accompanying drawing, the numeral 1 designates generally a tractor having connected to the differential housing thereof a pair of rearwardly extending draw bars 3, the point of pivotal connection being beneath and somewhat forwardly of the tractor axle. The housing 2 likewise has pivoted thereto at a point above the axle a pair of rearwardly extending crank levers 4. A thrust link 6 is pivoted to the rearwardly extending arms 5 of these crank levers. This thrust link is yieldably sustained by the coiled spring 7 which while compressible is of such strength as to sustain the thrust resulting from a normal load but when excessive load is exerted thereon, through the thrust link, results in the actuation of a hydraulic control or lift instrumentality generally designated 8. Actuation of the said instrumentality results in pivoting of hydraulic lift arms 9, which are pivotally connected by means of connecting lift rods 10 with the draw bars 3. The draw bars 3 are thereby elevated sufficiently to enable the implement to be elevated above the obstruction. Referring to Fig. 1, the reference numeral 11 designates a manual control which is effective on the hydraulic control instrumentality 8 when actuated by the operator to elevate or otherwise adjust positioning of the draw bar.

This structure corresponds in general to that of the said Ferguson patents. When operatively associated with a specially designed plow or plow having specially designed hitch elements, the structure functioned to increase the traction under certain draft load conditions. Our invention provides a draft mechanism which results in these desirable traction conditions when used in connection with various types of agricultural or soil-working implements or vehicles—that is, such implements or vehicles do not require a special structure to cooperate with the mechanisms of the type of the tractor mechanisms referred to.

Our improved tractor hitch mechanism designated generally by the numeral 12 comprises a pair of laterally spaced vertically disposed arms or lever members 13, the lower portions 14 of which, in the embodiment illustrated, are parallel and spaced so that they may be disposed on the inner sides of the draft bars 3. The upper portions 15 of these arm or lever members converge upwardly and terminate in parallel portions 16 which are pivotally connected to the link 6 by the bolt or pin 19. The upper ends of the arms are maintained in spaced relation by the spacer sleeve 17 surrounding the connecting bolt 18. These arm or lever members are connected to the draw bars by the pivot rod 20 which is disposed at the upper ends of the parallel portions 14 of the arms and secured in position by the keys 26.

At the lower ends of the arms we mount a hitch bar 21 having a longitudinally spaced series of holes 22 adapted to receive the pin or draw bolt 23 of the clevis or coupling member 24, the clevis connecting the draft tongue 25 of the drawn implement or vehicle to the hitch bar. The hitch bar has journal-like portions at its ends arranged through the levers and is retained by means of the keys 26. By providing the plurality of holes 22 with which the draw bolt or clevis 24 may be selectively engaged, the structure is made further adaptable for various types of implements.

In operation, with this arrangement of parts, the draft load of the propelled implement or vehicle is exerted on the hitch bar and tends to pivot the arms or levers 13 around their pivot attachment to the draw bars, thereby placing the thrust stress on the thrust link which thrust stress is resiliently resisted by the spring 7 up to the point of yielding of the spring. This torsional stress results in increased traction on the traction wheels, corresponding to the draft load of the implement, and this results without regard to the type of implement or vehicle drawn, and regardless of the implement or vehicle attached the structure of our invention is quickly and easily applied to the tractor draft means without any change in widely used types of structures. So connected, any of the foregoing types of implements are effective to exert a definite traction increasing effect on the tractor or to operate the hydraulic or other draw bar elevating control thereof in the event the obstruction from travel is excessive.

An embodiment of the invention which incorporates the principles of the invention in a highly desirable manner has been illustrated and described, though we are aware that other embodiments within the intent of the invention will suggest themselves to those skilled in the art. It should be understood that the foregoing terminology is used only descriptively rather than in a limiting sense, and with full intention to include equivalents of the features shown and described, within the scope of the following claims.

Having thus described our invention, what we claim as new and desire to secure by Letters Patent, is:

1. In combination with a tractor having a pair of laterally spaced draw bars, a thrust link, and an automatic means controlled by said link for elevating said draw bars, of a pair of arms disposed vertically in spaced relation on the inner side of said draw bars, said arms having parallel lower portions and inwardly converging upper portions terminating in parallel end portions pivotally connected to the rear end of said link, a pivot rod connecting said parallel lower portions of said arms to said draw bars, and a hitch bar extending between and pivotally mounted on the said lower portions of said arms at a point substantially below said pivot rod to cause draft on said hitch bar to create thrust on said thrust link, said hitch bar being provided with a plurality of longitudinally spaced holes adapted to selectively receive the pin of a clevis or coupling element for attaching an implement thereto.

2. In combination with a tractor having a pair of laterally spaced draw bars, a thrust link, and an automatic means controlled by said link for elevating said draw bars, of a pair of vertically disposed arms operatively connected to said link, a pivot rod connecting said arms to said draw bars, and a hitch bar pivotally mounted on said arms at a point substantially below said pivot rod to cause draft on said hitch bar to create thrust on said thrust link, said hitch bar being provided with a plurality of longitudinally spaced holes adapted to selectively receive the pin of a clevis or coupling element for attaching an implement thereto.

3. In combination with a tractor having a pair of laterally spaced draw bars, a thrust link, and an automatic means controlled by said link for elevating said draw bars, of a pair of vertically disposed arms operatively connected to said link, a pivot rod connecting said arms to said draw bars, and a hitch bar connected to said arms at a substantial distance from said pivot rod.

4. In a draft attachment for tractors having a draw bar, a thrust link, and an automatic means controlled by said link for elevating said draw bar, the combination of vertically disposed arms pivotally connected to said draw bar and having their upper ends operatively connected to said link, and a hitch bar mounted on said arms at a point substantially below their pivot connection to said draw bar to cause draft on said hitch bar to create thrust on said thrust link, said hitch bar being adapted to selectively receive a coupling member for a drawn implement.

5. In a draft attachment for tractors having a draw bar, a thrust link, and an automatic means controlled by said link for elevating said draw bar, the combination of vertically disposed arms pivotally connected to said draw bar and having their upper ends operatively connected to said link, and a hitch member mounted on said arms at a point substantially below their pivot connection to said draw bar to cause draft on said hitch bar to create thrust on said thrust link.

6. In a structure of the class described, the combination with a tractor having a draw bar and automatic means for elevating said draw bar, of a draft arm pivotally connected to said draw bar and having its upper end operatively connected to said automatic control means, and implement coupling means connected to said arm at a point substantially below its point of connection to said draw bar.

7. In combination with a tractor having a draw bar, a thrust link, and an automatic instrumentality controlled by said link to elevate said draw bar, an attachment adapting said tractor for drawing various types of draft implements comprising a lever having a hitch member pivotally connected adjacent one end thereof, said lever being pivoted intermediate its ends to the draw bar of the tractor and said hitch member being disposed a substantial distance below the pivot point of the lever to the draw bar to constitute a crank of substantial length effective about said pivot point, said lever being pivoted adjacent the other end thereof to said thrust link, said hitch member having means for coupling the same at a predetermined level with a variety of implements to be selectively drawn whereby the drag of the latter is effective through said lever to exert substantial forward thrust on said link.

8. A draft attachment for a tractor having rearwardly extending draft means and traction controlling thrust means, a member having a pair of upstanding side supports, and a hitch bar extending therebetween at one end thereof and pivotally connected thereto, said member being pivotally connected at the end thereof remote from said hitch bar to said thrust means and intermediate the ends to said draft means, said hitch bar having means for connecting the same to an implement to be drawn whereby drag load of the latter is effective through said member on said thrust means to exert traction increasing thrust on the latter.

9. In combination with a tractor having a draw bar, a thrust link, and an automatic instrumentality controlled by said link to elevate said draw bar, of an attachment adapting said tractor for drawing various types of implements, comprising a pair of spaced vertically disposed arms having a lateral hitch bar pivotally connected therebetween, a pivot rod on said arms medially of the length thereof and above said hitch bar, said rod being pivotally connected to the draw bar of the tractor, said hitch being suspended by said arms a substantial distance beneath said pivot rod to constitute a crank of substantial length effective about the pivot of the attachment to the draw bar, and means on the other side of said arms from said pivot rod for pivotally connecting the arms to said thrust link, said coupling bar having means for releasably engaging the same with implements to be drawn at a predetermined constant height, the drag of the latter being effective through said coupling bar, arms and link connecting means to exert substantial forward thrust on said link.

10. In combination with a tractor having a draw bar, a thrust link, and an automatic instrumentality controlled by said link to elevate said draw bar, of an attachment adapting said tractor for drawing various types of implements, comprising a pair of spaced vertically disposed arms having a lateral hitch bar pivotally connected therebetween, means pivotally connecting said arms medially of the length thereof and above said hitch bar to the draw bar of the tractor, said hitch being suspended by said arms a substantial distance beneath said last named means to constitute a crank of substantial length effective about the pivot of the attachment to the draw bar, and means on the other side of said arms from said draw bar pivoting means for pivotally connecting the arms to said thrust link, said coupling bar being releasably engageable with implements to be drawn at a predetermined constant height, the drag of the latter being effective through said coupling bar, arms and link connecting means to exert substantial forward thrust on said link.

BENJAMIN C. OLMSTEAD.
FRANK J. TERRY.